(12) United States Patent
Zhijun

(10) Patent No.: US 10,882,274 B2
(45) Date of Patent: Jan. 5, 2021

(54) MAGNETIC AND FIT ANTI-PEEPING GRATING FILM

(71) Applicant: Deng Zhijun, Changning (CN)

(72) Inventor: Deng Zhijun, Changning (CN)

(73) Assignee: Deng Zhijun, Hunan (CN)

( * ) Notice: Subject to any disclaimer, the term of this patent is extended or adjusted under 35 U.S.C. 154(b) by 391 days.

(21) Appl. No.: 15/746,922

(22) PCT Filed: May 9, 2017

(86) PCT No.: PCT/CN2017/083662
§ 371 (c)(1),
(2) Date: Jan. 23, 2018

(87) PCT Pub. No.: WO2017/193918
PCT Pub. Date: Nov. 16, 2017

(65) Prior Publication Data
US 2020/0079055 A1 Mar. 12, 2020

(30) Foreign Application Priority Data

May 12, 2016 (CN) .................... 2016 2 0434030 U

(51) Int. Cl.
*G02B 5/18* (2006.01)
*B32B 7/10* (2006.01)
*G02B 1/10* (2015.01)

(52) U.S. Cl.
CPC .................. *B32B 7/10* (2013.01); *G02B 1/10* (2013.01); *G02B 5/18* (2013.01)

(58) Field of Classification Search
CPC ............ G02B 27/4211; G02B 27/4272; G02B 27/0037; G02B 5/1814; G02B 5/1895;
(Continued)

(56) References Cited

U.S. PATENT DOCUMENTS

| 2004/0170868 A1* | 9/2004 | Hattori | ................. H01F 10/265 428/842.1 |
| 2005/0018865 A1* | 1/2005 | Azima | .................. H04R 7/045 381/190 |
| 2005/0276998 A1* | 12/2005 | Sato | ..................... G11B 5/7325 428/831 |

FOREIGN PATENT DOCUMENTS

CN 201690492 U * 12/2010
CN 201690492 U 12/2010
(Continued)

OTHER PUBLICATIONS

International Search Report and Written Opinion from International Application No. PCT/CN2017/083662 dated Aug. 7, 2017.

*Primary Examiner* — William R Alexander
*Assistant Examiner* — Tamara Y. Washington
(74) *Attorney, Agent, or Firm* — Getech Law LLC; Jun Ye

(57) ABSTRACT

The disclosure provides a magnetic and fit anti-peeping grating film which includes: a magnetic and fit anti-peeping grating film including: an anti-peeping grating film consisting of anti-peeping materials which can be used to control the angle of user's view; a magnetic layer consisting of magnetic materials which can be used to attract the surface of viewing screen; a double faced adhesive tape of which one side is pasted on magnetic layer and the other side is pasted on anti-peeping grating film. Further, the magnetic and fit anti-peeping grating film can be pasted directly on the surface of electronic products without the application of glue, which can effectively avoid the existence of bubbles on the surface of electronic products and prevent the damage of surface screen of electronic products.

3 Claims, 2 Drawing Sheets

(58) Field of Classification Search
CPC .......... G02B 5/18; G02B 5/1866; G02B 1/04; G02B 1/041; B42D 25/328; B42D 25/29; B42D 2033/10; B42D 2033/04; B42D 2033/18; B42D 2033/20; B42D 2033/24; B29D 11/00769; B29D 11/0073; B29D 11/00269; B32B 2307/416; B32B 2307/00; B32B 38/06; B32B 2307/40
See application file for complete search history.

(56) References Cited

FOREIGN PATENT DOCUMENTS

| | | |
|---|---|---|
| CN | 204515780 U | 7/2015 |
| CN | 205651761 U | 10/2016 |

* cited by examiner

MAGNETIC AND FIT ANTI-PEEPING GRATING FILM

TECHNICAL FIELD

This disclosure involves in a magnetic and fit anti-peeping grating film.

BACKGROUND TECHNOLOGY

At present, the privacy film for electronic products, such as a computer privacy film (privacy film), is pasted on the surface of a computer screen by means of glue. During the actual operation, there are bubbles between the computer privacy film and the computer screen. It is required to squeeze bubbles to discharge them, which may easily cause the abrasion of computer privacy film or computer screen. Moreover, the computer privacy film cannot be repeatedly disassembled and reused, because the privacy film will also affect the transmission rate after controlling the view angle. Most of the computer users want use the privacy film in public and dismantle it in private environment. If the privacy film uses the glue, it cannot be perfectly used again after being disassembled, resulting in unnecessary losses. Therefore, it is necessary to invent a new type of computer privacy film to solve the above problem.

CONTENT OF UTILITY MODEL

The purpose of this disclosure is to overcome the technical defects and provide a magnetic and fit anti-peeping grating film which has the characteristics of good conformability and privacy.

This disclosure includes: a magnetic and fit anti-peeping grating film including:

A anti-peeping grating film consisting of anti-peeping materials which can be used to control angle of user's view;

A magnetic layer consisting of magnetic materials which can be used to attract the surface of viewing screen;

A double faced adhesive tape of which one side is pasted on magnetic layer and the other side is pasted on anti-peeping grating film.

Furthermore, the said anti-peeping grating film, double faced adhesive tape and magnetic layer are arranged in three layers from top to bottom and the bottom of said anti-peeping grating film is hollowed area. The double faced adhesive tape and magnetic layer are respectively around this hollowed area.

Furthermore, the said anti-peeping grating film, double faced adhesive tape and magnetic layer are arranged in three layers from bottom to top and the top of said anti-peeping grating film is hollowed area. The double faced adhesive tape and magnetic layer are respectively around this hollowed area.

Furthermore, the said anti-peeping grating film, double faced adhesive tape and magnetic layer are arranged in one layer and the magnetic layer is around the anti-peeping grating film. The upper and lower sides of said anti-peeping grating film, double faced adhesive tape and magnetic layer are provided with decorative layers or not provided with decorative layers.

This disclosure adopts the principles of magnetism or magnetic attraction and the magnetic and fit anti-peeping grating film can directly attract the surface of electronic products without the application of glue, which can effectively avoid the existence of bubbles on the surface of electronic products and prevent the damage of surface screen of electronic products; furthermore, the anti-peeping grating film can protect the information of users and prevent others from peeping the important information on the screen to avoid the unnecessary losses, which can improve the safety performance of products.

FIGURE INSTRUCTION

In order to explain the technological scheme in the embodiment of this magnetic and fit anti-peeping grating film or existing technologies more clearly, the brief introduction is given below about the figures used in the description of embodiment of this magnetic and fit anti-peeping grating films. The figures in the description below are only the embodiments of this disclosure. The ordinary technicians in this field can obtain other figures according to these figures without creative efforts.

SPECIFIC MODE OF EXECUTION

The technological scheme in the embodiment of this disclosure will be clearly and completely described below combining with the figures in the embodiment of this disclosure. The described embodiments of disclosure are just a part of embodiments of disclosure and are not all the embodiments of this disclosure. All other embodiments of disclosure obtained by the ordinary technicians in this field based on the embodiments of this disclosure without creative efforts are included in the scope of protection of this disclosure.

Figure 1:
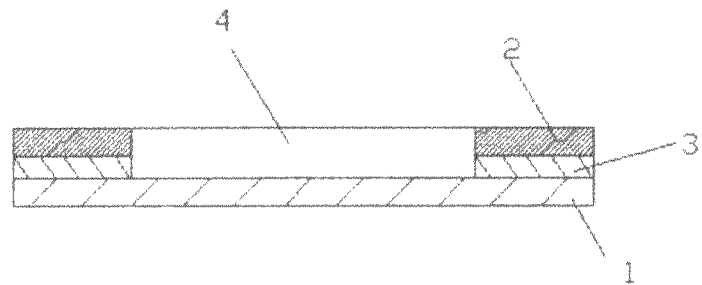
FIG. 1 is the schematic diagram of the first embodiment provided by the embodiment of this magnetic and fit anti-peeping grating film model.
Figure 2:
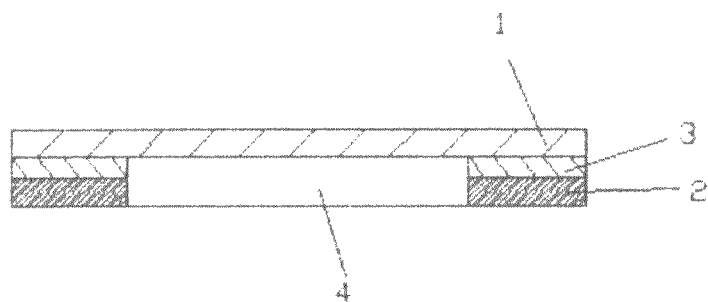
FIG. 2 is the schematic diagram of the second embodiment provided by the embodiment of this magnetic and fit anti-peeping grating film model.
Figure 3:
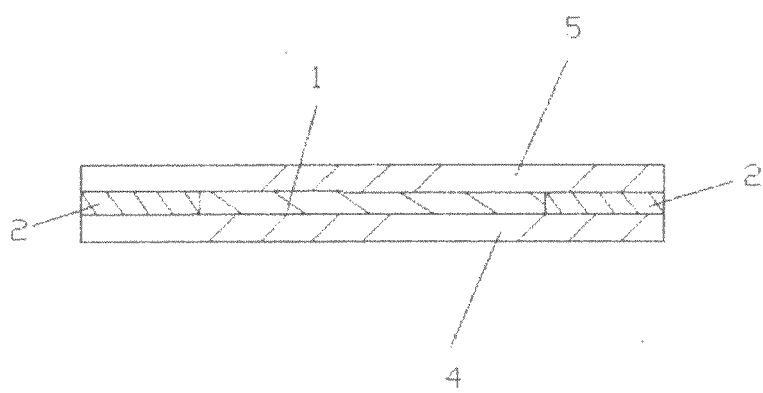
FIG. 3 is the schematic diagram of the third embodiment provided by the embodiment of this magnetic and fit anti-peeping grating film model.
Figure 4:
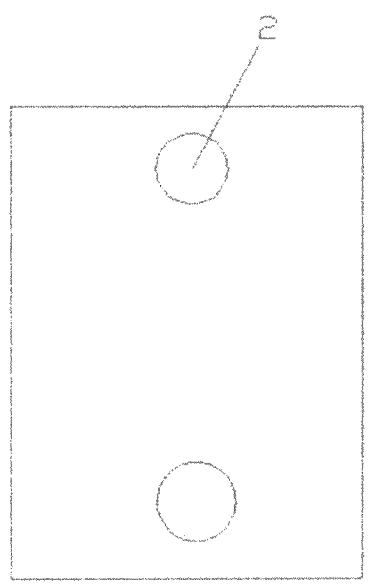
FIG. 4 is the top view provided by the embodiment of this magnetic and fit anti-peeping grating film.

As shown in FIG. 1-4, the embodiment of this disclosure provides a magnetic and fit anti-peeping grating film including: an anti-peeping grating film 1 consisting of anti-peeping materials which can be used to control angle of user's view; a magnetic layer 2 consisting of magnetic materials which can be used to attract the surface of viewing screen; a double faced adhesive tape 3 of which one side is pasted on magnetic layer 2 and the other side is pasted on anti-peeping grating film 1.

Please refer to the embodiment 1 of disclosure. The said anti-peeping grating film 1, double faced adhesive tape 3 and magnetic layer 2 are arranged in three layers from top to bottom and the bottom of said anti-peeping grating film 1 is hollowed area. The double faced adhesive tape 3 and magnetic layer 2 are respectively around this hollowed area 4, i.e. any positions around hollowed area 4.

Please refer to the embodiment 2 of disclosure. The said anti-peeping grating film 1, double faced adhesive tape 3 and magnetic layer 2 are arranged in three layers from bottom to top and the top of said anti-peeping grating film 1 is hollowed area 4. The double faced adhesive tape 3 and magnetic layer 2 are respectively around this hollowed area 4, i.e. any positions around hollowed area 4.

Please refer to the embodiment 3 of disclosure. The said anti-peeping grating film 1, double faced adhesive tape 3 and magnetic layer 2 are arranged in one layer and the magnetic layer 2 is around the anti-peeping grating film 1. The upper and lower sides of said anti-peeping grating film 1, double faced adhesive tape 3 and magnetic layer 2 are provided with decorative layers 5 or not provided with decorative layers 5.

The magnetic and fit anti-peeping grating film in this design can be applied on the surface of electronic products, such as mobile phones, computers, tablet computers, etc. The magnetic layer 2 can directly attract the surface of electronic products, which adopts the principles of magnetism or magnetic attraction. The magnetic and fit anti-peeping grating film can directly attract the surface of electronic products without the application of glue, which can effectively avoid the existence of bubbles on the surface of electronic products and prevent the damage of surface screen of electronic products; furthermore, the anti-peeping grating film 1 can protect the information of users and prevent others from peeping the important information on the screen to avoid the unnecessary losses, which can improve the safety performance of products.

All mentioned above are the best embodiments of this disclosure which are not used to limit this disclosure. Any modifications, equivalent replacement, improvements, etc. made within the spirit and principle of this utility shall be included in the scope of protection of this disclosure.

The invention claimed is:

1. A magnetic and fit anti-peeping grating film comprising:
   an anti-peeping grating film consisting of anti-peeping materials which can be used to control angle of user's view;
   a magnetic adsorption layer consisting of magnetic materials which can be used to adsorb the surface of viewing screen; and
   a double faced adhesive tape of which one side is pasted on magnetic adsorption layer and the other side is pasted on anti-peeping grating film,
   wherein the said anti-peeping grating film, double faced adhesive tape and magnetic adsorption layer are respectively arranged in three layers adjacent to each other.

2. The magnetic and fit anti-peeping grating film as specified in claim 1, wherein the bottom of said anti-peeping grating film is a hollowed area and the double faced adhesive tape and magnetic adsorption layer are respectively around this said hollowed area.

3. A magnetic and fit anti-peeping grating film comprising:
   an anti-peeping grating film consisting of anti-peeping materials which can be used to control angle of user's view;
   a magnetic adsorption layer consisting of magnetic materials which can be used to adsorb the surface of viewing screen; and
   a double faced adhesive tape of which one side is pasted on magnetic adsorption layer and the other side is pasted on anti-peeping grating film,
   wherein the said anti-peeping grating film, double faced adhesive tape and magnetic adsorption layer are arranged in one layer, the magnetic adsorption layer is around the anti-peeping grating film, and the upper and lower sides of said anti-peeping grating film, and double faced adhesive tape and magnetic adsorption layer are provided with decorative layers.

* * * * *